(12) United States Patent
Vrind et al.

(10) Patent No.: US 12,232,005 B2
(45) Date of Patent: Feb. 18, 2025

(54) METHODS AND SYSTEMS FOR DEPLOYING AND SHARING AERIAL CELLS IN AN MMTC SYSTEM

(71) Applicant: SAMSUNG ELECTRONICS CO., LTD., Suwon-si (KR)

(72) Inventors: Tushar Vrind, Karnataka (IN); Lalit Kumar Pathak, Karnataka (IN); Sudharshan Rao B, Karnataka (IN); Debabrata Das, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 388 days.

(21) Appl. No.: 17/804,782

(22) Filed: May 31, 2022

(65) Prior Publication Data
US 2023/0010479 A1   Jan. 12, 2023

Related U.S. Application Data

(63) Continuation-in-part of application No. 17/754,073, filed as application No. PCT/KR2020/012998 on Sep. 24, 2020.

(30) Foreign Application Priority Data

Sep. 24, 2019 (IN) ............................ 201941038569
Sep. 22, 2020 (IN) ............................ 201941038569

(51) Int. Cl.
*H04W 4/70* (2018.01)
*H04W 16/26* (2009.01)
*H04W 24/02* (2009.01)

(52) U.S. Cl.
CPC ............. *H04W 4/70* (2018.02); *H04W 16/26* (2013.01); *H04W 24/02* (2013.01)

(58) Field of Classification Search
CPC ....... H04W 4/70; H04W 16/26; H04W 24/02; H04W 4/02; H04W 28/0875; H04W 28/094
See application file for complete search history.

(56) References Cited

U.S. PATENT DOCUMENTS 8,364,155 B1   1/2013   Ahmed et al.
9,363,008 B2   6/2016   Boss et al.
(Continued)

FOREIGN PATENT DOCUMENTS

| CN | 106416345 | 2/2017 |
| CN | 109862585 | 6/2019 |

(Continued)

OTHER PUBLICATIONS

Qianqian Zhang et al: "Predictive Deployment of UAV Base Stations in Wireless Networks: Machine Learning Meets Contract Theory", ARXIV.ORG, Cornell University Library, 201 Olin Library Cornell University Ithaca, NY 14853, Nov. 3, 2018 (Nov. 3, 2018), XP081557399.

(Continued)

*Primary Examiner* — Christine Ng
(74) *Attorney, Agent, or Firm* — CHAU & ASSOCIATES, LLC

(57) ABSTRACT

A method for deploying and sharing aerial cells in a massive machine type communication (mMTC) network includes forecasting data traffic across a plurality of mMTC network operators for each of a plurality of geographical areas. The method includes generating a forecasted plan based on the forecasted data traffic, and a hovering time of each of a plurality of aerial cells. The method includes deploying and sharing at least one aerial cell from the plurality of aerial cells between the plurality of mMTC network operators to provide coverage to at least one mMTC node in at least one (Continued)

geographical area of the plurality of geographical areas, based on the forecasted plan.

16 Claims, 8 Drawing Sheets

(56) References Cited

U.S. PATENT DOCUMENTS

| | | | |
|---|---|---|---|
| 10,292,062 | B2 | 5/2019 | Centonza et al. |
| 10,645,018 | B2 | 6/2020 | Kubba |
| 2003/0176192 | A1* | 9/2003 | Morimoto .............. H04W 48/20 455/423 |
| 2009/0209223 | A1 | 8/2009 | Kone et al. |
| 2010/0165882 | A1 | 7/2010 | Palanki et al. |
| 2010/0265867 | A1* | 10/2010 | Becker .................. H04W 72/30 370/312 |
| 2011/0086641 | A1 | 4/2011 | Guvenc et al. |
| 2011/0190003 | A1 | 8/2011 | Hiltunen et al. |
| 2014/0092803 | A1 | 4/2014 | Picker |
| 2016/0028471 | A1 | 1/2016 | Boss et al. |
| 2016/0295429 | A1 | 10/2016 | Enqvist |
| 2017/0034706 | A1 | 2/2017 | Ericson et al. |
| 2017/0034711 | A1* | 2/2017 | Tsuda .................... H04W 72/56 |
| 2017/0126309 | A1 | 5/2017 | Rupasinghe et al. |
| 2018/0083671 | A1 | 3/2018 | Alexander et al. |
| 2018/0184463 | A1 | 6/2018 | Fakoorian et al. |
| 2018/0262413 | A1 | 9/2018 | Sureka |
| 2018/0267524 | A1* | 9/2018 | Chen .................... G05D 1/0005 |
| 2019/0112039 | A1* | 4/2019 | Pfaller ................ B64C 29/0025 |
| 2019/0155660 | A1 | 5/2019 | McQuighan et al. |
| 2019/0297555 | A1 | 9/2019 | Hampel et al. |
| 2020/0245208 | A1 | 7/2020 | Tsuda et al. |
| 2020/0252838 | A1* | 8/2020 | Akdeniz ........... H04W 36/0061 |
| 2021/0007037 | A1 | 1/2021 | Sharma et al. |
| 2021/0037452 | A1 | 2/2021 | Tsuda et al. |
| 2021/0144626 | A1 | 5/2021 | Han et al. |
| 2021/0377936 | A1 | 12/2021 | Yuan et al. |
| 2021/0405655 | A1* | 12/2021 | Yi ........................ G05D 1/0011 |

FOREIGN PATENT DOCUMENTS

| | | |
|---|---|---|
| EP | 2938117 | 10/2015 |
| WO | WO 2017-220110 | 12/2017 |
| WO | WO 2018-219443 | 12/2018 |

OTHER PUBLICATIONS

Hu Xuanguang et al: "Deployment of UAV and Interference Coordination in UAV-assisted Cellular Networks", 2018 IEEE/CIC International Conference on Communications in China (ICCC Workshops), IEEE, Aug. 16, 2018 (Aug. 16, 2018), pp. 153-157, XP033532747, DOI: 10.1109/ICCCHINAW.2018.8674489.

Ali Muntadher A et al: "Delay-Oriented Spectrum Sharing and Traffic Offloading in Coexisting UAV-Enabled Cellular and WiFi Networks", 2018 IEEE International Symposium on Dynamic Spectrum Access Networks (DYSPAN), IEEE, Oct. 22, 2018 (Oct. 22, 2018), pp. 1-7, XP033498650, DOI: 10.1109/DYSPAN.2018.86.

Zhang Chiya et al: "Spectrum Sharing in Drone Small Cells", 2016 IEEE Global Communications Conference (GLOBECOM), IEEE, Dec. 4, 2016 (Dec. 4, 2016), pp. 1-6, XP033059012, DOI: 10.1109/GLOCOM.2016.7842290 [retrieved on Feb. 2, 2017].

F. Tariq, et. al: "A speculative study on 6G," arXiv:1902.06700, 2019.

Latva-aho Matti, et.al. "Key drivers and research challenges for 6G", http://urn.fi/urn:isbn:9789526223544 , 2019.

Hsu-Tung Chien, et.al: "Multi-Operator Fairness in Transparent RAN Sharing by Soft-Partition With Blocking and Dropping Mechanism", IEEE Transactions on Vehicular Technology, 2018.

Faraj Lagum, et.al: "Strategic Densification With UAV-BSs in Cellular Networks" IEEE Wireless Communications Letters, 2018.

Irem Bor-Yaliniz, et.al: "The New Frontier in RAN Heterogeneity: Multi-Tier Drone-Cells", IEEE Communications Magazine, 2016.

Hoang Duy Trinh, et.al: "Mobile Traffic Prediction from Raw Data Using LSTM Networks", IEEE PIMRC, 2018.

Sima Stami-Namini, et.al: "A Comparison of ARIMA and LSTM in Forecasting Time Series", IEEE International Conference on Machine Learning and Applications (ICMLA), 2018.

FG-NET-2030, ITU, "Network 2030 Vision. A Blueprint of Technology, Applications and Market Drivers Towards the Year 2030 and Beyond", 2019.

Yilmaz ONC, Teyeb O, Orsino A, "Overview of LTE-NR dual connectivity" IEEE Communication Magazine 57.138? 144, 2019.

Roshni Chatterjee, Tushar Vrind, "Improved Network Analytics with novel feedback quantities for Self-Optimized Networks", EAI Endorsed Trans. Cloud Systems 4(13): e4 , 2018.

Qianqian Zhang, et.al: "Machine for Predictive On-Demand Deployment of UAVs for Wireless Communications" IEEE Global Communications Conference (GLOBECOM), 2018.

Gyunam Park ; Minseok Song: "Prediction-based Resource Allocation using LSTM and Minimum Cost and Maximum Flow Algorithm", International Conference on Process Mining (ICPM), 2019.

Amin Azari, et.al: "User Traffic Prediction for Proactive Resource Management: Learning-Powered Approaches", arXiv:1906.00951v1, 2019.

Multi-Tier Drone Architecture for 5G.B5G Cellular Networks Challenges, Trends, and Prospects.

3GPP, Technical Report, 38.811: "Study on New Radio (NR) to support non terrestrial networks" (Release 15), 2018.

TS 22.125 V17.1.0 (Dec. 2019), Unmanned Aerial System (UAS) support in 3GPP; Stage 1.

3GPP, Techical Specification 23.251 "Network Sharing; Architecture and functional description" Release 15. 2018.

3GPP, Technical Specification 32.130, "Network sharing; Concepts and requirements" (Release 14), 2016.

Chiya Zhang, et.al: "Spectrum Sharing for Drone Networks", IEEE Journal on Selected Areas in Communications, 2017.

Office Action issued in corresponding U.S. Appl. No. 17/754,073 dated Jul. 10, 2023.

* cited by examiner

| Parameter | mMTC served by NTN | eMBB served by terrestrial network |
|---|---|---|
| Data Traffic | Periodic, Event-triggered, Delay Insensitive | A-periodic, Delay Sensitive |
| Location | Remote, Non-residential | Urban, Residential |
| Use case | Environment and Ambience Sensing | Smartphone, User-centric experiences |
| Device needs | Limited Coverage, Low Capacity | High Capacity and High Coverage |
| Network Deployment | Primary: NTN cell connected to terrestrial network wirelessly | Primary: Terrestrial cell, augmented by NTN cell |

FIG. 1

| Sharing Architecture | Network Assets for Aerial Communication | | | |
|---|---|---|---|---|
| | Aerial Platform (AP) | Aerial Cell | Backhaul | Spectrum |
| Shared AP | Shared | Not Shared | Not Shared | Not Shared |
| Shared Backhaul | Shared | Not Shared | Shared | Not Shared |
| A-MORAN | Shared | Shared | Shared | Not Shared |
| A-MOCN | Shared | Shared | Shared | Shared |

FIG.5

METHODS AND SYSTEMS FOR DEPLOYING AND SHARING AERIAL CELLS IN AN MMTC SYSTEM

CROSS REFERENCE TO RELATED APPLICATIONS

This application is a Continuation-in-Part of co-pending U.S. patent application Ser. No. 17/754,073, filed on Mar. 23, 2022, which is a National Stage application, filed under 35 U.S.C. § 371, of International Patent Application No. PCT/KR2020/012998, filed on Sep. 24, 2020, which claims priority to Indian Provisional Patent Application No. 201941038569, filed on Sep. 24, 2019, and Indian Patent Application No. 201941038569, filed on Sep. 22, 2020, the contents of which are incorporated by reference herein in their entirety.

TECHNICAL FIELD

The present disclosure relates to massive machine type communication (mMTC) systems and, more particularly to methods and systems for deploying and sharing aerial cells in an mMTC system.

DISCUSSION OF THE RELATED ART

Non-Terrestrial Networks (NTNs) such as aerial networks provide aerial cells, which have been used for extending coverage area and enhancing a capacity of terrestrial networks. The aerial cells may include Low Altitude Platform (LAP) based aerial cells, or High Altitude Platform (HAP) based aerial cells. The aerial cells may be deployed as drones, which are dynamic in terms of mobility and may be used on-demand. The $3^{rd}$ Generation Partnership Project (3GPP) specification supports Unmanned Aerial System as the aerial cells or Node B as the aerial cells, which can also be referred to as an UxNB. Also, a literature on $6^{th}$ Generation (6G) networks acknowledge the aerial networks/NTNs as a key enabler in expanding coverage and capacity. In accordance with the 3GPP specification, the aerial cells have been deployed opportunistically by forecasting data traffic.

The aerial networks/NTNs may be used in enhanced mobile broadband (eMBB) applications, massive Machine Type Communication (mMTC) systems, or the like. Due to the aerial networks, use cases of the eMBB applications and the mMTC system may get expanded coverage.

Dense urban deployments with collocated terrestrial cells from multiple operators are suitable for handling capacity related issues in the eMBB applications. In the dense urban deployments, the aerial networks augment the terrestrial networks to enhance the capacity. Also, in the dense urban deployments, a discussed sharing can be used for more efficient resource utilization of the aerial networks. In contrast, the use cases of the mMTC systems require a network connectivity to both densely and sparsely deployed Internet of Things (IoT) devices that drive many ubiquitous applications such as, but are not necessarily limited to, smart meters, e-health monitoring, environment sensing for agriculture, and so on. Such requirements the mMTC systems have to be sent periodically, or in event-based reports or in keep-alive messages, which are insensitive to latency, as depicted in FIG. 1. For example, for most of the use cases of the mMTC systems in non-residential scenarios, like remotely located sensors, deploying the terrestrial network is not cost-effective due to limited traffic and diminishing return on investment (ROI). In such a coverage limited mMTC systems, deploying the aerial cells offers an excellent alternative, as the ROI can be increased. However, the 3GPP specification does not disclose any efficient mechanisms to deploy the aerial cells in the mMTC systems.

Further, in the use cases of the eMBB applications, the data traffic may accumulated easily at a terrestrial cell level. However, in the case of the coverage limited mMTC system, due to the lack of terrestrial infrastructure, the data traffic is acquired using other methods for a geographical area.

Further, as the aerial cells are battery-operated drones, hovering time of the aerial cells is limited to barely a few hours. Whenever serving time of the aerial cells exceed the hovering time, there is a requirement for additional aerial cells to replace energy-depleted aerial cells, which increases both a fleet size and wastes energy. In comparative approaches, maximizing the usage of the deployed aerial cells is useful, since the aerial cells are designed with a small battery to reduce a payload size (up to a few kilograms) and thereby having limited hovering time (up to few hours~1) between the replacements. Also, there is an associated cost of an aerial infrastructure that is optimized both in terms of capital expenditure (CAPEX) and operation expenditure (OPEX). The 3GPP has defined an architecture and scenarios for infrastructure sharing in the terrestrial network. However, the 3GPP specification does not support any architecture and scenarios for the infrastructure sharing in the aerial networks to reduce the CAPEX and the OPEX.

SUMMARY

A method for deploying and sharing aerial cells across a plurality of massive machine type communication (mMTC) network operators includes forecasting, by an mMTC aerial asset manager (AAM), data traffic across the plurality of mMTC network operators for each geographical area. The method further includes generating, by the mMTC AAM, a forecasted plan based on the forecasted data traffic and hovering time of each of a plurality of aerial cells. The method further includes deploying, by the mMTC AAM, at least one aerial cell from the plurality of aerial cells to provide coverage to at least one mMTC node in at least one geographical area, based on the forecasted plan. The method further includes sharing, by the mMTC AAM, the deployed at least one aerial cell between the plurality of mMTC network operators based on the forecasted plan.

A massive machine type communication (mMTC) aerial asset manager (AAM) includes a memory, and a controller coupled to the memory and configured to forecast data traffic across the plurality of mMTC network operators for each geographical area, generate a forecasted plan based on the forecasted data traffic, and hovering time of each of a plurality of aerial cells, deploy the at least one aerial cell from the plurality of aerial cells to provide coverage to at least one mMTC node in at least one geographical area, based on the forecasted plan, and share the deployed at least one aerial cell between the plurality of mMTC network operators based on the forecasted plan.

A massive machine type communication (mMTC) system includes a plurality of mMTC nodes, a plurality of mMTC network operators, a plurality of aerial cells coupled to the plurality of mMTC network operators, and an mMTC aerial asset manager (AAM) coupled to the plurality of mMTC network operators and configured to forecast data traffic across the plurality of mMTC network operators for each geographical area, generate a forecasted plan based on the forecasted data traffic, and hovering time of each of a plurality of aerial cells, deploy the at least one aerial cell from the plurality of aerial cells to provide coverage to at least one mMTC node in at least one geographical area, based on the forecasted plan, and share the deployed at least one aerial cell between the plurality of mMTC network operators based on the forecasted plan.

BRIEF DESCRIPTION OF FIGURES

A more complete appreciation of the present disclosure and many of the attendant aspects thereof will be readily obtained as the same becomes better understood by reference to the following detailed description when considered in connection with the accompanying drawings, wherein:

FIG. 1 is a table depicting differences between enhanced mobile broadband (eMBB) and massive Machine Type Communication (mMTC) systems, wherein requirements of the mMTC systems are insensitive to latency;

FIG. 5 is a table depicting various classifications based on the sharing of assets of the aerial cells, according to embodiments as disclosed herein;

DETAILED DESCRIPTION

Figure 2:
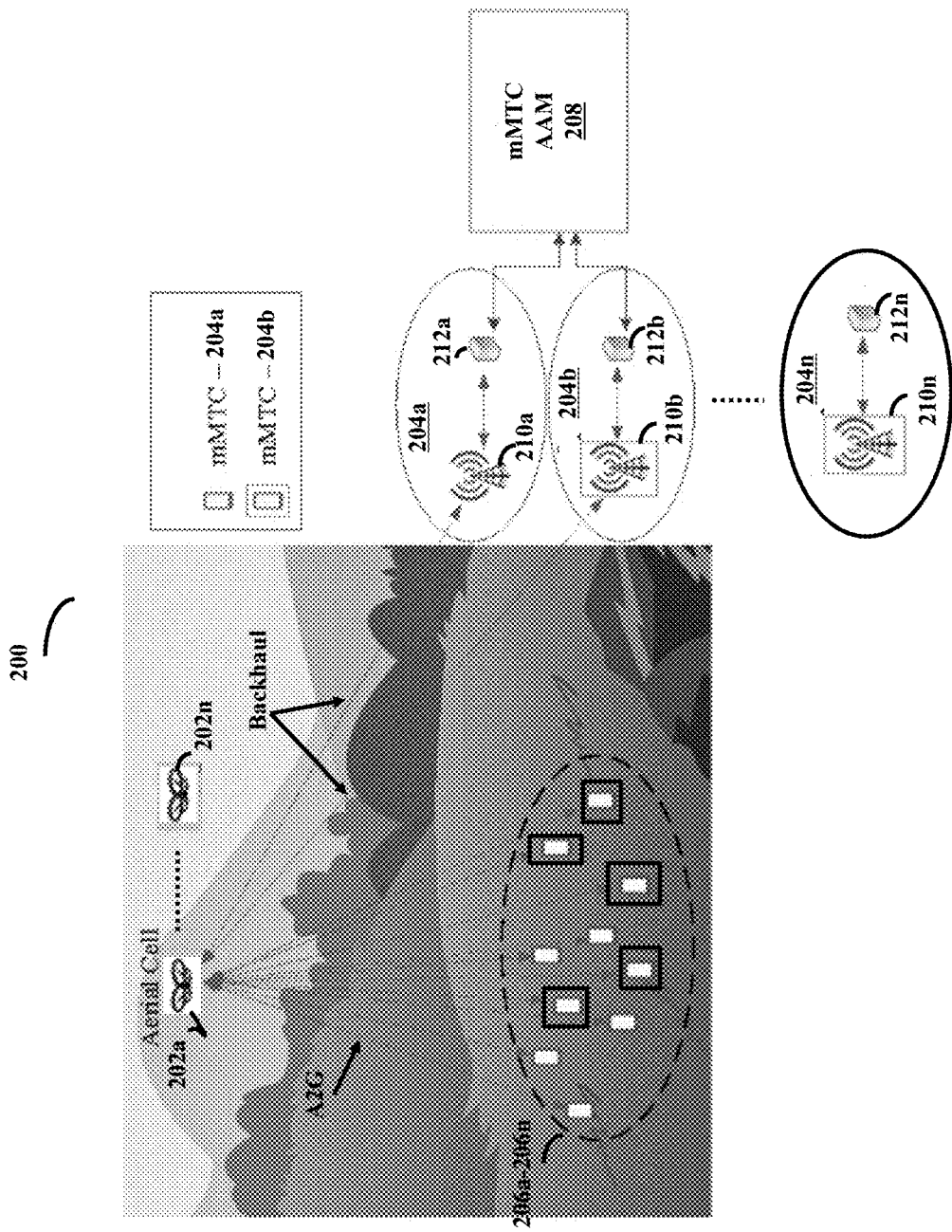
FIG. 2 is a schematic diagram depicting a massive machine type communication (mMTC) system, in which aerial cells may be deployed and shared across a plurality of mMTC network operators, according to embodiments as disclosed herein.

The example embodiments described herein and the various features and aspects thereof are explained more fully with reference to the embodiments illustrated in the accompanying drawings.

Embodiments herein disclose methods and systems for deploying and sharing of aerial cells between massive machine type communication (mMTC) network operators in a mMTC system.

Referring now to the drawings, and more particularly to FIGS. 2 through 8, where similar reference characters denote corresponding features consistently throughout the figures, there are shown example embodiments.

FIG. 2 depicts a massive machine type communication (mMTC) system 200, in which aerial cells 202a-202n may be deployed and shared across a plurality of mMTC network operators 204a-204n, according to embodiments as disclosed herein. The mMTC system/network 200 referred to herein may be configured to provide an aerial infrastructure sharing for mMTC network operators requiring limited coverage, and low capacity. In the aerial infrastructure sharing, the mMTC network operators may share assets such as, but are not necessarily limited to, an aerial platform, network elements/aerial cells, a licensed spectrum, or the like. The mMTC network operators may use the aerial infrastructure sharing to serve mMTC nodes that intermittently transmit small amounts of data traffic. The aerial infrastructure sharing increases coverage, extends capacity, and enhances operations of the mMTC system 200. The mMTC system 200 with aerial infrastructure sharing may be used for applications such as, but are not necessarily limited to, smart meters, e-health monitoring, environment sensing for agriculture, or any other application that requires a network connectivity/coverage to both sparsely and densely deployed Internet of Things (IoT) devices.

The mMTC system 200 includes a plurality of aerial cells 202a-202n, a plurality of mMTC network operators 204a-204n, a plurality of mMTC nodes 206a-206n, and an mMTC aerial asset manager (AAM) 208.

The plurality of aerial cells 202a-202n may be referred to as cells, which have been provided by a non-terrestrial network (NTN)/aerial network for extending coverage area and enhancing capacity of a terrestrial network. The plurality of aerial cells 202a-202n may be deployed by connecting to drones/Unmanned Aerial vehicles (UAVs) using a radio link interface (air-interface). Thus, the aerial cells 202a-202n may be deployed as drones/UAVs.

The plurality of aerial cells 202a-202n may be managed and controlled by an aerial cell infrastructure server. The aerial cell(s) (202a-202n) may be connected to the one or more base stations BSs 210a-210n of the mMTC network operators 204a-204n using a backhaul link. The aerial cell(s) (202a-202n) may be connected to the one or more mMTC nodes 206a-206n using an air to ground (A2G) link. In an embodiment, the plurality of aerial cells 202a-202n may be Low Altitude Platform (LAP) based aerial cells.

The plurality of aerial cells 202a-202n may be configured to provide coverage to the one or more mMTC nodes 206a-206n in remote geographical areas. The one or more mMTC nodes 206a-206n may be subscribers of the one or more mMTC network operators 204. Functions, structure, and other information related to the aerial cells 202a-202n may be intuitively inferred by one of ordinary skill in the art by referring to the $3^{rd}$ Generation Partnership Project (3GPP) specification. Embodiments herein use the terms such as "aerial cells", "drone cells", "UAV cells", "Node B", "UxNB", "LAP aerial cells", and so on, interchangeably for referring to a cell in the aerial network, that provides coverage to the mMTC nodes 206a-206n in the remote geographical areas.

The plurality of mMTC network operators 204a-204n uses the one or more aerial cells 202a-202n to provide coverage to the mMTC nodes 206a-206n in the remote geographical areas, which enable the mMTC nodes 206a-206n to connect with the terrestrial network/terrestrial backhaul network for communication services and a mMTC server. Examples of the communication services may be, but are not necessarily limited to, a voice service session, a live streaming service session, a real time gaming service session, a buffered streaming service session, a Transport Control Protocol (TCP) based session (for example, an email, a messaging service, a file transferring service, and so on), an Internet Protocol (IP) Multimedia Subsystem (IMS) service, and so on. Examples of the mMTC network operators 204a-204n may be, but are not necessarily limited to, a 3rd Generation Partnership Project (3GPP), a Long Term Evolution (LTE/4G), an LTE-Advanced (LTE-A), a Fifth Generation (5G) New Radio (NR), a Wireless Local Area Network (WLAN), Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), a Wireless Local Area Network (WLAN), Worldwide Interoperability for Microwave Access (WiMAX/IEEE 802.16), Wi-Fi (IEEE 802.11), Evolved-UTRA (E-UTRA), Wi-Fi Direct, or any other next generation network.

The mMTC network operators 204a-204n include Radio Access Networks (RANs)/BSs 210a-210n respectively, and Core Networks (CNs) 212a-212n respectively. The BS (210a-210n) may include at least one of, an evolved node B (eNB), a gNodeB (gNB), and so on. The BS (for example, 210a) located within the coverage area of the mMTC network operator (204a-204n) may be connected to other BS (210b-210n) using the radio link and the corresponding CN 212a using the backhaul link/backhaul. The BS (210a-210n) may be connected to the one or more aerial cells 202a-202b using the backhaul link. The BS (210a-210n) may also be connected to the one or more mMTC nodes 206a-206n. In an example, the BS (210a-210n) may be connected to the one or more mMTC nodes 206a-206n directly. In an example, the BS (210a-210n) may be connected to the one or more mMTC nodes 206a-206n through the aerial cells 202a-202n. The BS (210a-210n) may be configured to connect the one or more mMTC nodes 206a-206n to the respective CN (212a-212n), wherein the mMTC node 206 may be connected to the aerial cell 202a coupled with the BS (210a-210n). The CN (212a-212n) may include at least one of, a 5G Core (5GC) network, an Evolved Packet Core (EPC) and so on. The CN (212a-212n) may be configured to connect the one or more mMTC nodes 206a-206n connected to the associated BS (210a-210n) through the aerial cell 202a to an external data network for the communication services. Examples of the external data network may be, but are not necessarily limited to, the Internet, a Packet Data Network (PDN), an Internet Protocol (IP) Multimedia Core Network Subsystem, and so on.

The mMTC nodes 206a-206n referred to herein may be any devices capable of connecting with the one or more aerial cells 202a-202n. Examples of the mMTC nodes 206a-206n may be, but are not necessarily limited to, a mobile phone, a smartphone, a tablet, a phablet, a personal digital assistant (PDA), a laptop, a computer, a wearable computing device, a vehicle infotainment device, an IoT device, a Wireless Fidelity (Wi-Fi) router, a USB dongle, or any other device capable of connecting with the one or more aerial cells 202a-202n.

The mMTC nodes 206a-206n may be subscribers of the one or more mMTC network operators 204a-202n. The mMTC nodes 206a-206n belonging to the mMTC network operators 204a-204n may be simultaneously connected to the respective BSs 210a-210n and the aerial cells 202a-202n using a Carrier Aggregation (CA) or a Dual Connectivity (DC).

In the mMTC system 200, communication between the aerial cells 202a-202n and the BSs 210a-210n of the mMTC network operators 204a-204n and communication between the aerial cells 202a-202n and the mMTC nodes 206a-206n may be established using wireless links. The wireless links used to establish the communication between the aerial cells 202a-202n and the BSs 210a-210n may include at least one of, but is not necessarily limited to, a Point to Point (P2P) link, an Integrated Access Backhaul (IAB) link, and so on. If the communication between the aerial cell (for example, 202a) and the BSs 210a-210n is established using the P2P link, frequencies used for the communication between the aerial cell 202a and the mMTC nodes 206a-2026n and frequencies used for communication between the aerial cell(s) 202a and the BSs 210a-210n are different. If the communication between the aerial cell 202a and the BSs 210a-210n is established using the IAB link, the frequencies used for the communication between the aerial cell 202a and the mMTC nodes 206a-206n and the frequencies used for communication between the aerial cell 202a and the BSs 210a-210n are the same.

The mMTC AAM/mMTC enhanced AAM 208 referred to herein may be least one of, but is not necessarily limited to being, a cloud computing device (e.g., may be a part of a public cloud or a private cloud), a server, a database, a computing device, and so on. The server may be a stand-alone server, a server on a cloud, and/or the like. The computing device may be, but is not necessarily limited to being, a personal computer, a notebook, a tablet, desktop computer, a laptop, a handheld device, a mobile device, and so on. The mMTC AAM 208 may be a microcontroller, a processor, a System on Chip (SoC), an integrated chip (IC), a microprocessor based programmable electronic device, and so on. The mMTC AAM 208 may act as an interface between the plurality of mMTC network operators 204a-204n and the mMTC aerial cell infrastructure server managing the plurality of aerial cells 202a-202n. The mMTC AAM 208 may be connected to the CNs 212a-212n of the plurality of mMTC network operators 204a-204n and the mMTC aerial cell infrastructure server using a communications network. The communications network may include at least one of, but is not necessarily limited to including, a wired network, a value added network, a wireless network, a satellite network, or a combination thereof. Examples of the wired network may be, but are not necessarily limited to, a Local Area Network (LAN), a Wide Area Network (WAN), an Ethernet, and so on. Examples of the wireless network may be, but are not necessarily limited to being, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on.

In an embodiment, the mMTC AAM/mMTC enhanced AAM 208 may be a device configured to manage deploying and sharing of the one or more aerial cells 202a-202n across the plurality of mMTC network operators 204a-204n. In an example, the mMTC AAM 208 shares the one or more aerial cells 202a-202n across the plurality of mMTC network operators 204a-204n using Aerial Multi-Operator Core Networking (A-MOCN).

For managing deploying and sharing of the one or more aerial cells 202a-202n, the mMTC AAM 208 forecasts data traffic across the plurality of mMTC network operators 204a-204n for each geographical area. In an example, the data traffic includes IoT data traffic.

For forecasting the data traffic, the mMTC AAM 208 trains a neural network and uses the trained neural network to forecast the data traffic. Examples of the neural network may be, but are not necessarily limited to being, a machine learning module, an Artificial Intelligence (AI) model, a machine learning model, a Convolutional Neural Network (CNN) model, a deep neural network (DNN) model, a recurrent neural network (RNN) model, a restricted Boltzmann Machine (RBM) model, a deep belief network (DBN) model, a bidirectional recurrent deep neural network (BRDNN) model, a generative adversarial networks (GAN) model, a regression based neural network model, a deep reinforcement model (with ReLU activation), a deep Q-network, and so on. The neural network may include a plurality of nodes, which may be arranged in the layers. Examples of the layers may be, but are not necessarily limited to being, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients. A topology of the layers of the neural network may vary based on the type of the classifier module 102a. In an example, the neural network may include an input layer, an output layer, and a hidden layer. The input layer receives a layer input (for example, data metrics collected from the mMTC nodes 206a-206n) and forwards the received layer input to the hidden layer. The hidden layer transforms the layer input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

For training the neural network, the mMTC AAM 208 receives the training datasets from the plurality of mMTC network operators 204a-204n. The training datasets indicate the data traffic monitored over time for a plurality of geographical areas corresponding to each mMTC network operator (204a-204n). The mMTC AAM 208 trains the neural network by updating parameters of the neural network based on the training datasets. The trained neural network may be a network model in which a number of layers, a sequence for processing the layers and the parameters related to each layer may be known and fixed for forecasting the data traffic. Examples of the parameters of the neural network may be, but are not necessarily limited to being, activation functions, biases, input weights, output weights, and so on, related to the layers of the neural network.

For forecasting the data traffic, the mMTC AAM 208 collects data traffic metrics from at least one of, the one or more mMTC network operators 204a-204n, the one or more mMTC nodes 206a-206n, device logs, and so on, for each geographical area. The data traffic metric indicates the data traffic generated between at least two-time instants and the associated mMTC network operator (204a-204n). The mMTC AAM 208 processes the collected data traffic metrics using the neural network to forecast the data traffic across the plurality of mMTC network operators 204a-204n for each geographical area corresponding to at least one time instant. Forecasting the data traffic using the neural network is described in detail in conjunction with FIG. 3.

On forecasting the data traffic, the mMTC AAM 208 generates a forecasted plan for deploying and sharing of the one or more aerial cells across the plurality of mMTC network operators 204a-204n. The mMTC AAM 208 analyses parameters such as, but are not necessarily limited to, the forecasted data traffic, a number of available aerial cells 202a-202n for deploying and sharing, a data traffic rate of each aerial cell (202a-202n), hovering time of each aerial cell, and so on, using an epoch-based time slicing to generate the forecasted plan. Generating of the forecasted plan using the epoch-based time slicing is described in detail in conjunction with FIG. 3. The forecasted plan indicates at least one of, but is not necessarily limited to, the one or more geographical area to deploy the one or more aerial cells 202a-202n for the at least one time instant, a number of aerial cells 202a-202n for sharing across the plurality of mMTC network operators 204a-204n, the plurality of mMTC network operators 204a-204n that share the one or more aerial cells 202a-202n for the at least one time instant, usage and trajectory of each aerial cell (202a-202n) in each geographical area, an epoch of time slice for each mMTC network operator (204a-204n) on the one or more aerial cells (202a-202n) for the at least one time instant, the hovering time of each aerial cell (202a-202n), and so on. The epoch of time slice for each mMTC network operator (204a-204n) is within the hovering time of the one or more aerial cells (202a-202n) during that one or more radio resources from the one or more aerial cells 202a-202n have been dedicated to the corresponding mMTC network operator (204a-204n).

The mMTC AAM 208 deploys the one or more aerial cells 202a-202n to provide coverage to the one or more mMTC nodes 206a-206n in the one or more geographical areas, based on the forecasted plan. On deploying the one or more aerial cells 202a-202n, the mMTC AAM 208 shares the deployed one or more aerial cells 202a-202n between the plurality of mMTC network operators 204a-204n based on the forecasted plan. In an example, sharing the one or more aerial cells 202a-202n between the plurality of mMTC network operators 204a-204n involves sharing assets of the one or more aerial cells 202a-202n between the plurality of mMTC network operators 204a-204n. Examples of the assets may be, but are not necessarily limited to, an aerial platform, network elements, a licensed spectrum, and so on.

The mMTC AAM 208 may deploy and share the one or more aerial cells 202a-202n between the plurality of mMTC network operators 204a-204n by communicating with the aerial cell infrastructure server and the plurality of mMTC network operators 204a-204n.

In an embodiment, sharing the one or more aerial cells 202a-202n across the plurality of mMTC network operators 204a-204n based on the forecasted plan reduces capital expenditure (CAPEX) by reducing aerial fleet size (i.e., a number of aerial cells deployed and shared) and operation expenditure (OPEX) in terms of increased hovering time utilization, which further increases return on investment (ROI).

Consider an example scenario, wherein the mMTC AAM 208 may be connected to five mMTC network operators (an operator 204a, an operator 204b, an operator 204c, an operator 204d, and an operator 204e), and the aerial infrastructure manager server managing five aerial cells (an aerial cell 202a, an aerial cell 202b, an aerial cell 202c, an aerial cell 202d, and an aerial cell 202e). In such a scenario, for deploying and sharing of the aerial cells, the mMTC AAM 208 forecasts the data traffic across each of the five mMTC network operators 204a-204e in each of the plurality of geographical regions served by the five mMTC operators 204a-204e for the given time (e.g., future) instance. Based on the forecasted data traffic and the hovering time of each of the five aerial cells 202a-202e, the mMTC AAM 208 generates the forecasted plan for deploying and sharing the five aerial cells 202a-202e. In an example, the forecasted plan indicates that an aerial cell 202a may be shared between the mMTC network operators 204a and 204b in a geographical region A for 15 minutes, and an aerial cell 202c may be shared between the mMTC network operators 204c, 204d, and 204e in a geographical region B for 20 minutes. The forecasted plan also indicates the hovering time of the aerial cells 202a and 202c, the epoch of time for the mMTC network operators 204a and 204b during which the radio resources of the aerial cell 202a may be dedicated to the mMTC network operators 204a and 204b, the epoch time for the mMTC network operators 204c, 204d, and 204e during which the radio resources of the aerial cell 202c may be dedicated to the mMTC network operators 204c, 204d, and 204e, the usage and trajectories of the aerial cells 202a and 202c, and so on. In accordance with the forecasted plan, the mMTC AAM 208 deploys the aerial cell 202a in the geographical region A and shares the assets of the aerial cell 202a between the mMTC network operators 204a and 204b for 15 minutes. Similarly, in accordance with the forecasted plan, the mMTC AAM 208 deploys the aerial cell 202c in the geographical region B and shares the assets of the aerial cell 202c between the mMTC network operators 204c, 204d, and 204e for 20 minutes.

FIG. 2 shows exemplary blocks of the mMTC system 200, but it is to be understood that other embodiments are not necessarily limited thereon. In other embodiments, the mMTC system 200 may include fewer or more blocks. Further, the labels or names of the blocks are used for illustrative purpose and do not necessarily limit the scope of the embodiments described herein. One or more blocks can be combined together to perform a same or a substantially similar function in the mMTC system 200.

Figure 3:
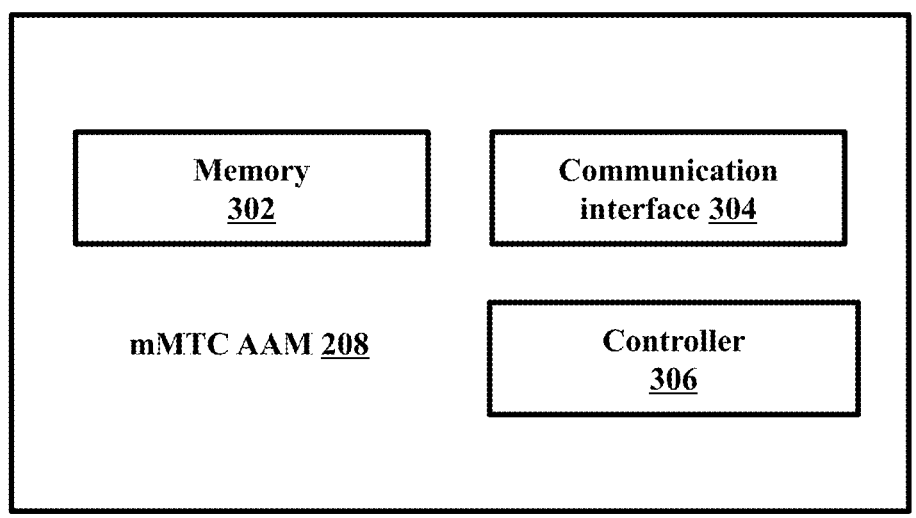
FIG. 3 is a block diagram depicting various components of an mMTC aerial asset manager (AAM) for deploying and sharing of aerial cells across the plurality of mMTC network operators, according to embodiments as disclosed herein.

FIG. 3 is a block diagram depicting various components of the mMTC AAM 208 for deploying and sharing the aerial cells 202a-202n across the plurality of mMTC network operators 204a-204n, according to embodiments as disclosed herein. The mMTC AAM 208 includes a memory 302, a communication interface 304, and a controller 306.

The memory 302 may store information about the aerial cells 202a-202n, the data traffic rate of each aerial cell (202a-202n), the forecasted data traffic, the forecasted plan/forecasted traffic plan, the usage, and/or trajectories of the aerial cells 202a-202n, and so on. The memory 302 may also store the neural network, which may be processed by the controller 306 to forecast the data traffic. As may be seen from FIG. 4, the memory 302 may also include a deployment and sharing manager 400, which may be processed by the controller 306 to manage deployment and sharing of the aerial cells 202a-202n across the plurality of mMTC network operators 204a-204n. Examples of the memory 302 may be, but are not necessarily limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard disk drives, optical discs, floppy disks, flash memory, or forms of electrically programmable memory devices (EPROM) or electrically erasable and programmable (EEPROM) memory devices. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 304 may be configured to enable the mMTC AAM 208 to communicate with the plurality of mMTC network operators 204a-204n, the aerial cell infrastructure server, and/or the like, using an interface supported by the communications network. Examples of the interface may be at least one of, but is not necessarily limited to, a wired or wireless fronthaul interface, a wired or wireless backhaul interface, or any structure supporting communications over a wired or wireless connection.

The controller 306 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 306 may be configured to manage deployment and sharing of the one or more aerial cells 202a-202n across the plurality of mMTC network operators 204a-204n. The controller 306 may process the deployment and sharing manager 400 stored in the memory 302 to manage deployment and sharing of the one or more aerial cells 202a-202n across the plurality of mMTC network operators 204a-204n.

For deploying and sharing of the aerial cells 202a-202n across the plurality of mMTC network operators 204a-204n, the controller 306 forecasts the data traffic across the plurality of mMTC network operators 204a-204n for each geographical area for the given time instance. The controller 306 trains the neural network and uses the trained neural network to forecast the data traffic across the plurality of mMTC network operators 204a-204n for each geographical area for the given time instance.

Examples of the neural network may be, but are not necessarily limited to, an AI model, a machine learning model, a CNN model, a DNN model, a RNN model, a RBM model, a DBN model, a BRDNN model, a GAN model, a regression based neural network, a deep reinforcement model (with ReLU activation), a deep Q-network, and so on. The neural network may include a plurality of nodes, which may be arranged in the layers. Examples of the layers may be, but are not necessarily limited to being, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients.

The neural network may be trained using at least one learning method to forecast the data traffic across the plurality of mMTC network operators 204a-204n for each geographical area for the given time instance. Examples of the learning method may be, but are not necessarily limited to, supervised learning, unsupervised learning, semi-supervised learning, reinforcement learning, regression-based learning, and so on. The neural network may be trained by applying the at least one learning method on the training datasets, which indicate the data traffic monitored over time for the plurality of geographical areas corresponding to each mMTC network operator (204a-204n). The trained neural network may be a neural network model in which a number of layers, a sequence for processing the layers and parameters related to each layer may be known and fixed for forecasting the data traffic. Examples of the parameters related to each layer may be, but are not necessarily limited to, activation functions, a loss function, biases, input weights, output weights, a learning rate, iterations, neurons per layer, values of the layers, optimizer, and so on, related to the layers of the neural network.

A function associated with the learning method may be performed through the non-volatile memory, the volatile memory, and the controller 306. The controller 306 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors forecast the traffic data across the plurality of mMTC network operators 204a-204n for each geographical region, in accordance with a predefined operating rule of the neural network, stored in the non-volatile memory and the volatile memory. The predefined operating rules of the neural network are provided through training the modules using the learning method.

Here, being provided through learning means that, by applying the learning method to a plurality of learning data (for example: the training datasets received from the plurality of mMTC network operators 204a-204n, or the like), a predefined operating rule of the neural network of a desired characteristic is made. Forecasting the data traffic may be performed in the mMTC AAM 208 itself in which the learning according to an embodiment is performed, and/or may be implemented through a separate server/system.

On training the neural network, the controller 306 collects the data traffic metrics from at least one of, the mMTC network operators 204a-204n, the one or more mMTC nodes 206a-206n, the device logs, and so on for each geographical area. The geographical area may be defined by a coordinate system in terms of a latitude and a longitude. In an example, the data traffic metric received from the mMTC nodes 206a-206n may indicate the data traffic generated between the two time instants with their respective mMTC network operators 204a-204n. The mMTC nodes 206a-206n may indicate the data traffic metrics to the controller 306, whenever the mMTC nodes 206a-206n come into the coverage of the aerial cells 202a-202n. The controller 306 processes the collected data metrics using the neural network to forecast the data traffic across the plurality of mMTC network operators 204a-204n for each geographical area for the given time instance.

On forecasting the data traffic, the controller 306 generates the forecasted plan based on at least one of, but is not necessarily limited to, the forecasted data traffic, the number of available aerial cells 202a-202n, the data traffic rate of each aerial cell (202a-202n), the hovering time of each aerial cell (202a-202n), and so on. The forecasted plan indicates at least one of, the one or more geographical areas to deploy the one or more aerial cells 202a-202n for the at least one time instant, the plurality of mMTC network operators 204a-204n that share the one or more aerial cells 202a-202n for the at least one time instant, the usage and the trajectory of each aerial cell 202a-202n for each geographical area, the epoch of time slice for each mMTC network operator (204a-204n) on the one or more aerial cells 202a-202n for the at least one time instant, the hovering time of each aerial cell (202a-202n), and so on. Based on the generated forecasted plan, the controller 306 deploys and shares the one or more aerial cells 202a-202n between the plurality of mMTC network operators 204a-204n in the one or more geographical areas for the at least one time instant.

Embodiments herein explain the forecasting of the data traffic using the neural network and generation of the forecasted plan using the epoch-based time slicing.

The controller 306 provides the collected data traffic metrics to the trained neural network, wherein the data traffic metrics indicate an input sequence (t) of data traffic for up to time t for a geographical area j. In such a scenario, the neural network operates over the input sequence of data traffic and predicts an output data traffic (t+1). The neural network represents the predicted output data traffic in terms of hypothesis $h_{model}(x(t))$. The hypothesis of the output data traffic may be the forecasted data traffic $P_{OP_iMTC_j}(t)$ in the geographic area $OP_iMTC_j$ for an mMTC network operator i. In an example, the forecasted data traffic may be represented as:

$$P_{OP_iMTC_j}(t) = h_{model}(\text{data traffic sequence}_{OP_iMTC_j}) \qquad (1)$$

The geographical area can make use of the one or more aerial cells 202a-202an for the mMTC network operator (204a-204n), when the forecasted data traffic in the geographical area is greater than a threshold data traffic $Th_{ga} \cdot uA_{OP_iMTC_j}(t)$. The threshold data traffic may be used to define the usage of the one or more aerial cells 202a-202n for the time instant t for the geographical area $OP_iMTC_j$. In an example, the usage of the one or more aerial cells 202a-202n for the time instant t for the $OP_iMTC_j$ may be represented as:

$$uA_{OP_iMTC_j}(t) = \begin{cases} 1 & \text{if } P_{OP_iMTC_j}(t) > Th_{ga} \\ 0 & \text{otherwise} \end{cases} \qquad (2)$$

In comparative approaches, a non-sharing scheme may be used for deploying the aerial cells. The non-sharing scheme provides a maximum number of the aerial cells in an aerial fleet to support deployment for the all the mMTC network operators at any time t. The number of aerial cells determined to be deployed in any geographical area $OP_iMTC_j$ depends on both how much the forecasted data traffic $P_{OP_iMTC_j}(t)$ is above the threshold $Th_{ga}$ and how much the forecasted data traffic is servable the aerial cell (i.e., the data traffic rate of the aerial cell $R_A$) within the associated hover time $H_A$. In an example, the modelling of the non-sharing scheme $Tot\_mMTC_{NS_A}$ is represented as:

$$Tot_{mMTC_{NS_A}} = \max_{0 \le t \le T} \left( \sum_{i=1}^{i=N} \sum_{j=1}^{j=M} \left( \left\lceil \frac{P_{OP_iMTC_j}(t) \times uA_{OP_iMTC_j}(t)}{R_A \times H_A} \right\rceil \right) \right) \qquad (3)$$

wherein, M defines the maximum offered capacity from the aerial cell. The $H_A$ defines the maximum hovering time of the aerial cell, which may be an integer multiple of t (i.e., $H_A = K \times t$). The aerial cell for the mMTC network operator may be limited by the capability of the mMTC nodes, and multi-carrier supported by the aerial cell. The $R_A$ represents an average data traffic rate in bytes per seconds from the aerial cell. The M defines the number of geographical areas to be served by each mMTC network operator. The N defines the number of mMTC network operators in the geographical area. The t defines the total time period for modelling the non-sharing scheme.

Further, the un-utilized hovering time of the aerial cells 202a-202n, which have been deployed for the $OP_iMTC_j$ in the non-sharing scheme may be represented as:

$$\text{RemH\_NSA}_{OP_iMTC_j}(t) = \frac{\left(P_{OP_iMTC_j}(t) \times uA_{OP_iMTC_j}(t)\right) - \left(\left[\frac{P_{OP_iMTC_j}(t) \times uA_{OP_iMTC_j}(t)}{R_A \times H_A}\right] \times R_A \times H_A\right)}{R_A} \quad (4)$$

A total un-utilized hovering time of the aerial cells 202a-202n in the non-sharing scheme may be an integral sum of:

$$Tot_{NS_{RemH_A}} = \int_0^{t=T} \text{RemH\_NSA}_{OP_iMTC_j}(t)dt \quad (5)$$

In contrast, the controller 306 uses the epoch-based time slicing (that may also be referred to as a sharing scheme) to generate the forecasted plan for deploying and sharing of the aerial cells 202a-202n across the plurality of mMTC network operators 204a-204n. The controller 306 analyzes at least one of, the forecasted data traffic, the hovering time of aerial cells 202a-202b, the data traffic rate of the aerial cells 202a-202n, or the like, using the epoch-based time slicing to generate the forecasted plan.

In the epoch-based time slicing, the forecasted data traffic $P_{OP_iMTC_j}(t)$ across the mMTC network operators 204a-204n may be collectively addressed by the controller 306 of the mMTC AAM 208 within the duration of the hovering time $H_A$. As soon as the aerial cell (202a-202n) is able to address the data traffic of the mMTC network operator (204a-204n) for the geographical area $OP_iMTC_j$, the controller 306 may share the aerial cell (202a-202n) with another mMTC network operator K in the same geographical area $OP_iMTC_j$. If the cumulated forecasted traffic in the geographical area is greater than the $Th_{ga} \cdot uA_{MTC_j}(t)$, the controller 306 defines the usage of the aerial cell (202a-202n) for the time instant t for the geographical area $MTC_j$ using the below equation:

$$uA_{MTC_j}(t) = \begin{cases} 1 & \text{if } \sum_{i=1}^{i=N} P_{OP_iMTC_j}(t) > Th_{ga} \\ 0 & \text{otherwise} \end{cases} \quad (6)$$

The controller 306 further determines the epoch of the time slice for each operator based on the forecasted data traffic, the hovering time of each aerial cell (202a-202n), the usage defined for each aerial cell (202a-202n), the data traffic rate of each aerial cell (202a-202n), or the like. Thus, making the time-slice also a predicted quantity. During the epoch of time slice, the radio resource allocation from the aerial cell (202a-202n) may be dedicated for the mMTC network operator (204a-204n) in the geographical area $OP_iMTC_j$. In an example, the epoch of time slice mMTCAerialTSP$_{OP_iMTC_j}$(t) may be determined as:

$$mMTCAerialTS_{OP_iMTC_j}(t) = \frac{\left(\left(\sum_{i=1}^{i=N} P_{OP_iMTC_j}(t) \times uA_{MTC_j}(t)\right) \times (H_A)\right)}{\left(P_{OP_iMTC_j}(t) \times uA_{MTC_j}(t)\right)} \quad (7)$$

The controller 306 also provides the number of aerial cells (202a-202n) to be shared between the plurality of mMTC network operators 204a-204n. In an example, the number of aerial cells (202a-202n) to be shared between the plurality of mMTC network operators 204a-204n may be represented as:

$$Tot_{mMTC_{NS_A}} = \max_{0 \le t \le T}\left(\sum_{j=1}^{j=M}\left(\left[\frac{P_{OP_iMTC_j}(t) \times uA_{MTC_j}(t)}{R_A \times H_A}\right]\right)\right) \quad (8)$$

The number of aerial cells 202a-202n determined for sharing between the plurality of mMTC network operators 204a-204n in the equation (8) (i.e., using the epoch-based time slicing/sharing scheme) may be lesser than the number of aerial cells 202a-202n determined for sharing between the plurality of mMTC network operators 204a-204n in the same geographical area MTC$_j$ using the equation (3) (i.e., using the non-sharing scheme).

The reduction in the fleet size from the sharing scheme is comparison to the non-sharing scheme is given by $\gamma\_mMTC_{fleet}$ in the below equation:

$$\gamma_{mMTC_{fleet}} = \frac{\left(Tot_{mMTC_{NS_A}} - Tot_{mMTC_{SA}}\right) \times 100}{Tot_{mMTC_{NS_A}}} \quad (11)$$

wherein, $$Tot_{mMTC_{NS_A}}$$

indicates the number of aerial cells determined for sharing using the non-sharing scheme and the $$Tot_{mMTC_{SA}}$$

indicates the number of aerial cells determined for sharing using the epoch-based time slicing/sharing scheme.

On determining the usage of aerial cells 202a-202n and the number of aerial cells 202a-202n for sharing, the controller 306 determines the un-utilized hovering time of the aerial cells (202a-202n), which will be deployed for the MTC$_j$ in the sharing scheme. In an example, the controller 306 determines the un-utilized hovering time of the aerial cells (202a-202n) in the sharing scheme as:

$$\text{RemH\_SA}_{MTC_j}(t) = \frac{\left(\sum_{i=1}^{i=N}\left(P_{OP_iMTC_j}(t) \times uA_{OP_iMTC_j}(t)\right)\right) - \left(\left[\frac{\sum_{i=1}^{i=N} P_{OP_iMTC_j}(t) \times uA_{MTC_j}(t)}{R_A \times H_A}\right] \times R_A \times H_A\right)}{R_A} \quad (9)$$

The controller 306 determines the total-unutilized hovering time of the aerial cells (202a-202n) in the sharing scheme, by the integral sum of:

$$Tot_{NS_{RemH_A}} = \int_0^{t=T} \text{RemH\_NSA}_{MTC_j}(t)dt \quad (10)$$

An increase in the hovering time utilization from the sharing scheme in comparison to the non-sharing scheme may be provided by $\gamma\_mMTC_{fleet}$ in the below equation:

$$\gamma_{mMTC_H} = \frac{Tot\_NS\_RemH_A - Tot\_S\_RemH_A \times 100}{Tot\_NS\_RemH_A} \quad (12)$$

wherein, the Tot_NS_RemH$_A$ indicates the hovering time utilization from the non-sharing scheme and the Tot_S_RemH$_A$ indicates the hovering time utilization from the sharing scheme.

The hovering time of the aerial cells 202a-202n might not be fully utilized when the aerial cells 202a-202n have not been shared between the mMTC network operators 204a-204n in the geographical area.

Figure 4:
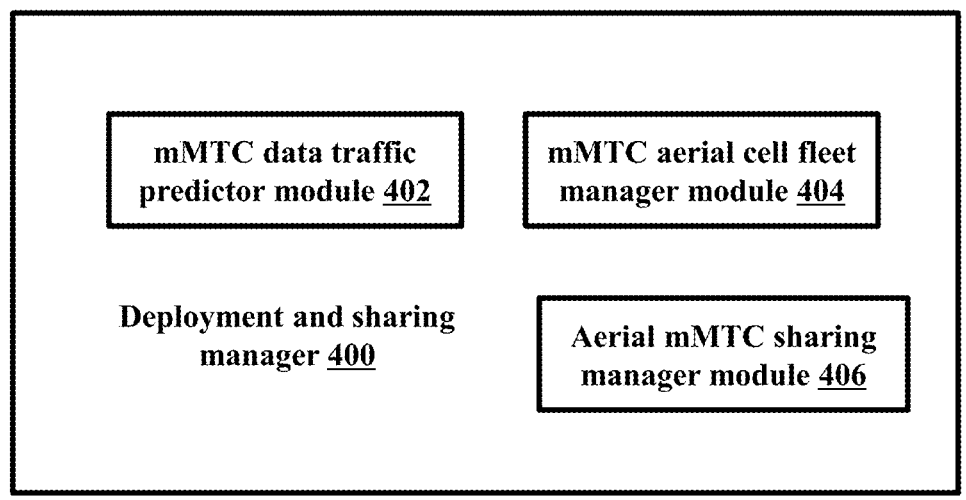
FIG. 4 is a block diagram depicting the deployment and sharing manager performable in the mMTC AAM for deploying and sharing aerial cells across the plurality of mMTC network operators, according to embodiments as disclosed herein.

FIG. 4 is a block diagram depicting the deployment and sharing manager 400 performable in the mMTC AAM 208 for deploying and sharing the aerial cells 202a-202n across the plurality of mMTC network operators 204a-204n, according to embodiments as disclosed herein. The deployment and sharing manager 400 may be processed/executed by the mMTC AAM 208 for deploying and sharing of the aerial cells 202a-202n across the plurality of mMTC network operators 204a-204n. The deployment and sharing manager 400 includes an mMTC data traffic predictor module 402, an mMTC aerial cell fleet manager module 404, and an aerial mMTC sharing manager module 406.

The mMTC data traffic predictor module 402 may be configured to obtain the data traffic metrics for each geographical area and forecasts the data traffic for each geographical area in the given period by processing the obtained data traffic metrics using the neural network. In an example, the mMTC data traffic predictor module 402 obtains the data traffic metrics from at least one of, the mMTC network operators 204a-204n, the mMTC nodes 206a-206n, the device logs, or the like, for each time instant (for example, for an hour). The data traffic metrics indicates the data traffic and the associated mMTC network operator (204a-204n). The mMTC data traffic predictor module 402 provides information about the forecasted data traffic to the mMTC aerial cell fleet manager module 404 and the aerial mMTC sharing manager 406.

The mMTC aerial cell fleet manager module 404 may be configured to determine the usage and the trajectory of the aerial cells 202a-202n based on the forecasted data traffic for each time instant. The mMTC aerial cell fleet manager module 404 provides information about the determined usage and trajectory of the aerial cells 202a-202n to the aerial mMTC sharing manager 406.

The aerial mMTC sharing manager 406 may be configured to generate the forecasted plan for deploying and sharing of the one or more aerial cells 202a-202n between the plurality of mMTC network operators 204a-204n. The aerial mMTC sharing manager 406 applies the epoch-based time slicing using the A-MOCN on the parameters such as, but are not necessarily limited to, the forecasted data traffic, the number of available aerial cells 202a-202n, the hovering time of each aerial cell (202a-202n), the data traffic rate of each aerial cell (202a-202n), the one or more geographical areas in which the one or more aerial cells 202a-202n have to be deployed, and so on, to generate the forecasted plan. The forecasted plan indicates at least one of, the one or more geographical areas to deploy the one or more aerial cells 202a-202n, the number of aerial cells 202a-202n for sharing, the one or more network operators that share each aerial cell (202a-202n), the usage and trajectory of each aerial cell (202a-202n), the hovering time for each aerial cell (202a-202n), the epoch of time slice for each mMTC network operator (204a-204n), and so on.

The forecasted plan may be used for the deployment of the one or more aerial cells 202a-202n in each of the geographical areas based on the data traffic forecasted in the mMTC system 200 across the mMTC network operators 204a-204n. The forecasted plan may also provide the predicted epoch of the time slice for each mMTC network operator on the aerial cells 202a-202n for each time instant t=TP. Deployment of the aerial cells 202a-202n using the forecasted plan maximizes the hovering time utilization of the aerial cells 202a-202n (for example, maximize (12)) and minimizes the requirement of the aerial cells (for example, maximize (11)).

In addition, deployment of the aerial cells 202a-202n using the forecasted plan reduces the CAPEX by reducing aerial fleet size and increases the OPEX in terms of increased hovering time utilization.

FIGS. 3 and 4 shows exemplary blocks of the mMTC AAM 208, but it is to be understood that embodiments are not necessarily limited thereon. For example, the mMTC AAM 208 may include fewer or more blocks. Further, the labels or names of the blocks are used for illustrative purpose and does not necessarily limit the scope of the embodiments herein. One or more blocks can be combined together to perform same or substantially similar function in the mMTC AAM 208.

FIG. 5 depicts the various classifications based on the sharing of the assets of the aerial cells 202a-202n, according to embodiments as disclosed herein. In an example, the spectrum required in the communication for the aerial cell (for example, 202a) to the mMTC node (for example, 206a), the wireless backhaul between the aerial cells 202a-202n, and the aerial cell 202a to the BS 210a (i.e., a terrestrial cell or a High Altitude Platform (HAP) based cell), may be shared between the mMTC network operators 204a-204n, likewise for other assets. In an embodiment, the aerial cells 202a-202n may be shared across the mMTC network operators 204a-204n to reduce the CAPEX and the OPEX for the mMTC network operators 204a-204n operators, which increases the ROI. As the mMTC node moves towards the A-MOCN, the ROI increases for the NTN, as more assets can be shared.

Figure 6:
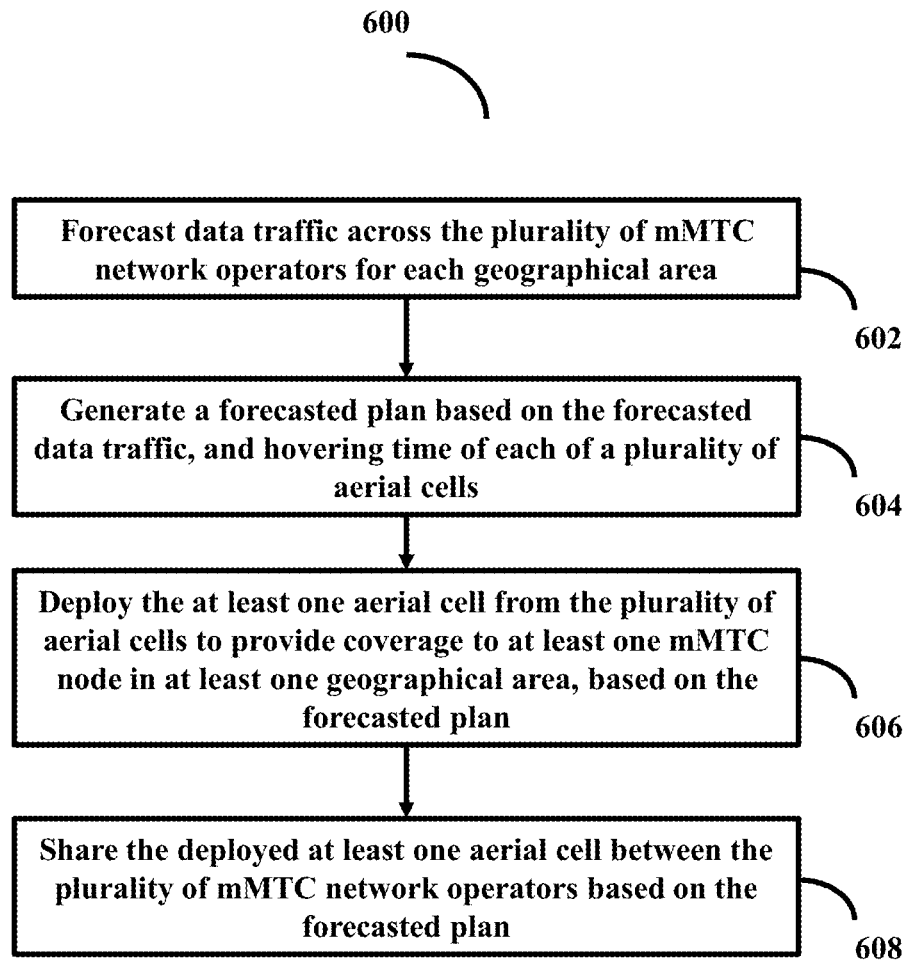
FIG. 6 is a flow diagram depicting a method for deploying and sharing of the aerial cells across the mMTC network operators, according to embodiments as disclosed herein.

FIG. 6 is a flow diagram depicting a method for deploying and sharing of the aerial cells 202a-202n across the mMTC network operators 204a-204n, according to embodiments as disclosed herein.

At step 602, the method includes forecasting, by the mMTC AAM 208, the data traffic across the plurality of mMTC network operators 204a-204n for each geographical area. The mMTC AAM 208 forecasts the data traffic using the neural network. A method for forecasting the data traffic is described in detail in conjunction with FIG. 7.

At step 604, the method includes generating, by the mMTC AAM 208, the forecasted plan based on the forecasted data traffic, and the hovering time of each of the plurality of aerial cells 202a-202n. A method for generating the forecasted plan is described in detail in FIG. 8.

At step 606, the method includes deploying, by the mMTC AAM 208, the at least one aerial cell from the plurality of aerial cells 202a-202n to provide coverage to the at least one mMTC node 206a-206n in the at least one geographical area, based on the forecasted plan.

At step 608, the method includes sharing, by the mMTC AAM 208, the deployed at least one aerial cell between the plurality of mMTC network operators 204a-204n based on the forecasted plan. Sharing of the at least one aerial cell between the plurality of mMTC network operators 204a-204n involves sharing the assets of the at least one aerial cell (for example, the aerial platform, the spectrum, the backhaul, or the like) between the plurality of mMTC network operators 204a-204n. The various actions in method 600 may be performed in the order presented, in a different order or simultaneously. Further, in some embodiments, some actions listed in FIG. 6 may be omitted.

Figure 7:
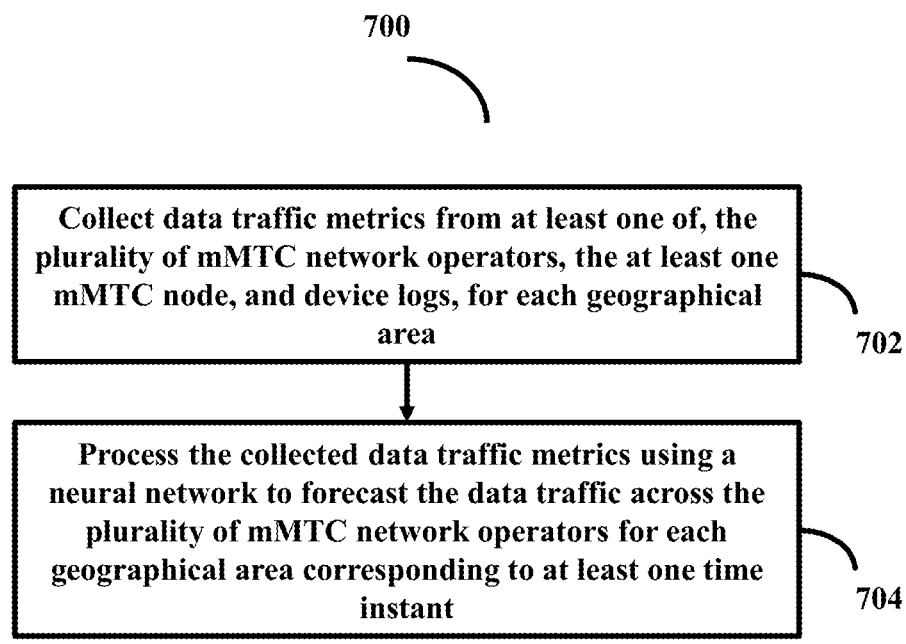
FIG. 7 is a flow diagram depicting a method for forecasting the data traffic across the plurality of mMTC network operators for each geographical area, according to embodiments as disclosed herein.

FIG. 7 is a flow diagram 700 depicting a method for forecasting the data traffic across the plurality of mMTC network operators for each geographical area, according to embodiments as disclosed herein.

At step 702, the method includes collecting, by the mMTC AAM 208, the data traffic metrics from at least one of, the mMTC network operators 204a-204n, the at least one mMTC node 206a-206n, the device logs, or the like, for each geographical area. The data traffic metric indicates the data traffic generated between at least two-time instants and the associated mMTC network operator.

At step 704, the method includes processing, by the mMTC AAM 208, the collected data traffic metrics using the neural network to forecast the data traffic across the plurality of mMTC network operators for each geographical area corresponding to at least one time instant. The various actions in method 700 may be performed in the order presented, in a different order or simultaneously. Further, in some embodiments, some actions listed in FIG. 7 may be omitted.

Figure 8:
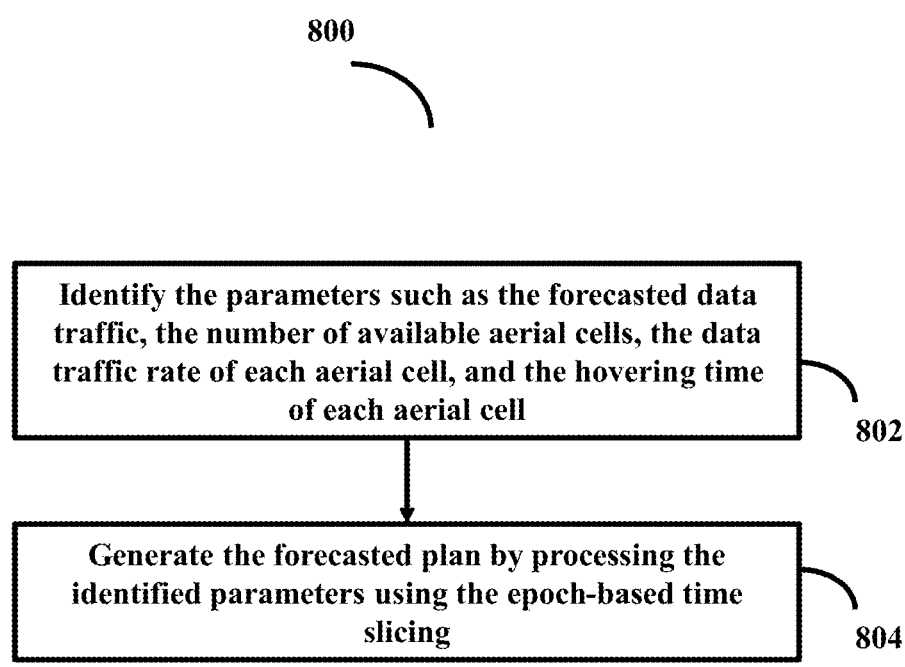
FIG. 8 is a flow diagram depicting a method for generating a forecasting plan, according to embodiments as disclosed herein.

FIG. 8 is a flow diagram 800 depicting a method for generating the forecasting plan, according to embodiments as disclosed herein.

At step 802, the method includes identifying, by the mMTC AAM 208, the parameters such as, but are not necessarily limited to, the forecasted data traffic, the number of available aerial cells 202a-202n, the data traffic rate of each aerial cell (202a-202n), the hovering time of each aerial cell (202a-202n), and so on.

At step 804, the method includes generating, by the mMTC AAM 208, the forecasted plan by processing the identified parameters using the epoch-based time slicing. The forecasted plan indicates at least one of, the at least one geographical area to deploy the at least one aerial cell for the at least one time instant, the plurality of mMTC network operators 204a-204n that share the at least one aerial cell for the at least one time instant, the number of aerial cells for sharing, the usage and the trajectory of each aerial cell for each geographical area, the epoch of time slice for each mMTC network operator on the at least one aerial cell for the at least one time instant, the hovering time of each aerial cell, or the like. The epoch of time slice for each mMTC network operator is within the hovering time of the at least one aerial cell during that at least one radio resource from the at least one aerial cell is dedicated to the corresponding mMTC network operator. The various actions in method 800 may be performed in the order presented, in a different order or simultaneously. Further, in some embodiments, some actions listed in FIG. 8 may be omitted.

Embodiments herein disclose an aerial infrastructure sharing for a coverage limited mMTC networks with which the operators can share assets like a spectrum, a LAP, an aerial cell, and network elements. Embodiments herein disclose an mMTC-enhanced-AAM which comprises of a mMTC data traffic predictor, for forecasting the IoT traffic, an aerial cell fleet manager for managing deployment and trajectory of LAPs, and an aerial sharing manager, which utilizes the hover time of aerial cell and plans a predicted epoch-based time-sliced sharing of aerial cells amongst operators.

Embodiments herein evaluate an accuracy of deep learning forecasting models like Long Short-Term Memory (LSTM) and Neural Network (NN) for forecasting the data traffic. The LSTM and the NN may provide a very low error. Thus, the data traffic in the mMTC system is easier to predict with a basic deep learning model like the NN. Using the NN, the mMTC-enhanced-AAM may predict the LAP deployment at a precise time of the day. The mMTC enhanced AAM may share the radio resources from the aerial cells between the mMTC network operators based on a dynamic epoch-based time slicing (mMTCAerialTS).

The embodiments disclosed herein can be implemented through at least one software program running on at least one hardware device and performing network management functions to control the elements. The elements shown in FIGS. 2, 3, and 4 can be a hardware device or a combination of a hardware device and a software module.

The embodiments disclosed herein describe methods and systems deploying and sharing of aerial cells in a mMTC system. This may include a computer readable means having a message stored therein, such computer readable storage means containing program code means for implementation of one or more steps of the method, when the program runs on a server or mobile device or any suitable programmable device. The method is implemented in an embodiment through or together with a software program written in e.g., Very high-speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description. Therefore, while the embodiments herein have been described with reference to the figures, those skilled in the art will recognize that the embodiments herein can be practiced with modification within the spirit and scope of the present disclosure.

What is claimed is:

1. A method for deploying and sharing aerial cells across a plurality of massive machine type communication (mMTC) network operators, the method comprising:
forecasting, by an mMTC aerial asset manager (AAM), data traffic across the plurality of mMTC network operators for each geographical area of a plurality of geographical areas;
generating, by the mMTC AAM, a forecasted plan based on the forecasted data traffic, and hovering time of each of a plurality of aerial cells;
deploying, by the mMTC AAM, at least one aerial cell from the plurality of aerial cells to provide coverage to at least one mMTC node in at least one geographical area of the plurality of geographical areas, based on the forecasted plan; and sharing, by the mMTC AAM, the deployed at least one aerial cell between the plurality of mMTC network operators based on the forecasted plan.

2. The method of claim 1, wherein the plurality of aerial cells are Low Altitude Platform (LAP) based aerial cells, wherein the forecasted data traffic includes Internet of Things (IoT) data traffic.

3. The method of claim 1, wherein forecasting, by the mMTC AAM, the forecasted data traffic includes:

collecting data traffic metrics from the plurality of mMTC network operators, the at least one mMTC node, and/or device logs, for each geographical area of the plurality of geographical areas, wherein the data traffic metrics indicate data traffic generated between at least two time instants and an associated mMTC network operator of the plurality of mMTC network operators; and processing the collected data traffic metrics using a neural network to forecast the data traffic across the plurality of mMTC network operators for each geographical area, of the plurality of geographic areas, corresponding to at least one time instant.

4. The method of claim 3, wherein the neural network is a trained neural network based on training datasets received from the plurality of mMTC network operators, wherein the training datasets indicate the data traffic monitored over time for a plurality of geographical areas corresponding to each mMTC network operator of the plurality of mMTC network operators.

5. The method of claim 3, wherein generating, by the mMTC AAM, the forecasted plan includes:

analyzing the forecasted data traffic, a number of available aerial cells of the plurality of aerial cells, a data traffic rate of each aerial cell of the plurality of aerial cells, and/or the hovering time of each of the plurality of aerial cells using an epoch-based time slicing to generate the forecasted plan.

6. The method of claim 5, wherein the forecasted plan indicates at least one of:

the at least one geographical area to deploy the at least one aerial cell for the at least one time instant;

a subset of aerial cells of the plurality of aerial cells for sharing between the plurality of mMTC network operators;

the plurality of mMTC network operators that share the at least one aerial cell for the at least one time instant;

usage and trajectory of each aerial cell of the plurality of aerial cells in the at least one geographical area; and an epoch of time slice for each mMTC network operator of the plurality of mMTC network operators on the at least one aerial cell for the at least one time instant.

7. The method of claim 6, wherein the epoch of time slice for each mMTC network operator of the plurality of mMTC network operators is within a hovering time of the at least one aerial cell of the plurality of aerial cells during a time that at least one radio resource from the at least one aerial cell is dedicated to a corresponding mMTC network operator of the plurality of mMTC network operators.

8. The method of claim 1, wherein sharing the at least one aerial cell of the plurality of aerial cells between the plurality of mMTC network operators includes:

sharing at least one asset of the at least one aerial cell of the plurality of aerial cells between the plurality of mMTC network operators, wherein the at least one asset includes an aerial platform, a spectrum, and/or a backhaul.

9. A massive machine type communication (mMTC) aerial asset manager (AAM) comprising:

a memory; and a controller coupled to the memory and configured to:

forecast data traffic across a plurality of mMTC network operators for each of a plurality of geographical areas;

generate a forecasted plan based on the forecasted data traffic, and a hovering time of each of a plurality of aerial cells;

deploy at least one aerial cell from the plurality of aerial cells to provide coverage to at least one mMTC node in at least one geographical area of the plurality of geographical areas, based on the forecasted plan; and share the deployed at least one aerial cell between the plurality of mMTC network operators based on the forecasted plan.

10. The mMTC AAM of claim 9, wherein the plurality of aerial cells are Low Altitude Platform (LAP) based aerial cells, wherein the data traffic includes Internet of Things (IoT) data traffic.

11. The mMTC AAM of claim 9, wherein the controller is configured to:

collect data traffic metrics from the plurality of mMTC network operators, the at least one mMTC node, and/or device logs, for each geographical area of the plurality of geographical areas, wherein a data traffic metric indicates the data traffic generated between at least two-time instants and an associated mMTC network operator of the plurality of mMTC network operators; and process the collected data traffic metrics using a neural network to forecast the data traffic across the plurality of mMTC network operators for each geographical area corresponding to at least one time instant.

12. The mMTC AAM of claim 11, wherein the neural network is a trained neural network based on training datasets received from the plurality of mMTC network operators, wherein the training datasets indicate the data traffic monitored over time for each of the plurality of geographical areas corresponding to each mMTC network operator of the plurality of mMTC network operators.

13. The mMTC AAM of claim 9, wherein the controller is configured to:

analyze at least one of, the forecasted data traffic, a number of available aerial cells, a data traffic rate of each aerial cell and the hovering time of each aerial cell using an epoch-based time slicing to generate the forecasted plan.

14. The mMTC AAM of claim 13, wherein the forecasted plan indicates at least one of:

the at least one geographical area to deploy the at least one aerial cell for the at least one time instant;

a number of aerial cells for sharing between the plurality of mMTC network operators;

the plurality of mMTC network operators that share the at least one aerial cell for the at least one time instant;

usage and trajectory of each aerial cell in the at least one geographical area; and an epoch of time slice for each mMTC network operator of the plurality of mMTC network operators on the at least one aerial cell for the at least one time instant.

15. The mMTC AAM of claim 14, wherein the epoch of time slice for each mMTC network operator of the plurality of mMTC network operators is within the hovering time of the at least one aerial cell during a time that at least one radio resource from the at least one aerial cell is dedicated to a corresponding mMTC network operator.

16. A massive machine type communication (mMTC) system, comprising:
- a plurality of mMTC nodes;
- a plurality of mMTC network operators;
- a plurality of aerial cells coupled to the plurality of mMTC network operators; and
- an mMTC aerial asset manager (AAM) coupled to the plurality of mMTC network operators and configured to:

forecast data traffic across the plurality of mMTC network operators for each of a plurality of geographical area;

generate a forecasted plan based on the forecasted data traffic, and hovering time of each of the plurality of aerial cells;

deploy at least one aerial cell from the plurality of aerial cells to provide coverage to at least one mMTC node in at least one geographical area, based on the forecasted plan; and share the deployed at least one aerial cell between the plurality of mMTC network operators based on the forecasted plan.

* * * * *